(12) United States Patent
Han et al.

(10) Patent No.: US 12,373,381 B1
(45) Date of Patent: Jul. 29, 2025

(54) USB HUB INTERNAL DATA TRANSMISSION METHOD AND USB HUB CHIP

(71) Applicant: NANJING QINHENG MICROELECTRONICS CO., LTD., Nanjing (CN)

(72) Inventors: Chun Han, Nanjing (CN); Xiang Ouyang, Nanjing (CN); Chunhua Wang, Nanjing (CN)

(73) Assignee: Nanjing Qinheng Microelectronics Co., Ltd., Nanjing (CN)

( * ) Notice: Subject to any disclaimer, the term of this patent is extended or adjusted under 35 U.S.C. 154(b) by 0 days.

(21) Appl. No.: 19/058,053

(22) Filed: Feb. 20, 2025

(30) Foreign Application Priority Data

Apr. 25, 2024 (CN) .......................... 202410504896.0

(51) Int. Cl.
*G06F 13/42* (2006.01)
*G06F 13/38* (2006.01)
(Continued)

(52) U.S. Cl.
CPC ........ *G06F 13/4282* (2013.01); *G06F 13/382* (2013.01); *G06F 13/4068* (2013.01); *H04J 3/0697* (2013.01); *H04L 49/109* (2013.01); *H04L 49/9023* (2022.05); *G06F 2213/0042* (2013.01)

(58) Field of Classification Search
CPC .............. G06F 13/4282; G06F 13/382; G06F 13/4068; G06F 2213/0042; H04L 49/9023; H04L 49/109; H04J 3/0697
See application file for complete search history.

(56) References Cited

U.S. PATENT DOCUMENTS

2003/0163627 A1* 8/2003 Deng .................. H03K 5/1252
710/305
2004/0225808 A1* 11/2004 Govindaraman ..... G06F 13/385
710/305
(Continued)

FOREIGN PATENT DOCUMENTS

CN 102681957 A 9/2012
CN 105897593 A 8/2016
(Continued)

*Primary Examiner* — Henry Tsai
*Assistant Examiner* — Harry Z Wang
(74) *Attorney, Agent, or Firm* — CBM PATENT CONSULTING, LLC

(57) ABSTRACT

The USB HUB chip comprises at least a first USB transceiver, a second USB transceiver, a data bit insertion unit, a high-speed routing module and a re-synchronization unit before transmitting. Before a serial data valid signal is asserted, inserted data is inserted into serial data and then transmitted to the high-speed routing module, and the data and a clock are re-synchronized before transmitting to complete internal data transmission. According to the invention, a 480 MHz clock does not need to be synchronously transmitted with the serial data, high-frequency radiation is reduced, time sequence mismatching between the serial data and a global clock does not need to be considered, the difficulty of wiring and layout design is reduced, valid serial data bits do not need to be wasted for clock synchronization, internal delay of the HUB is reduced, long-distance wiring or expansion of more USB ports is facilitated.

17 Claims, 2 Drawing Sheets

(51) Int. Cl.
*G06F 13/40* (2006.01)
*H04J 3/06* (2006.01)
*H04L 49/10* (2022.01)
*H04L 49/109* (2022.01)
*H04L 49/9023* (2022.01)

(56) References Cited

U.S. PATENT DOCUMENTS

| | | | | |
|---|---|---|---|---|
| 2010/0057955 | A1* | 3/2010 | Foster | G06F 13/385 |
| | | | | 710/61 |
| 2010/0235655 | A1* | 9/2010 | Tauscher | G06F 1/266 |
| | | | | 710/14 |
| 2011/0131356 | A1* | 6/2011 | Devam | G06F 13/426 |
| | | | | 710/105 |
| 2018/0300282 | A1* | 10/2018 | Vertenten | G06F 13/4059 |
| 2022/0190960 | A1* | 6/2022 | Arulappan | H04L 1/0083 |

FOREIGN PATENT DOCUMENTS

| | | | |
|---|---|---|---|
| CN | 112650701 A | 4/2021 | |
| CN | 112713901 A | 4/2021 | |

* cited by examiner

USB HUB INTERNAL DATA TRANSMISSION METHOD AND USB HUB CHIP

CROSS-REFERENCE TO RELATED APPLICATIONS

This application claims priority to Chinese Patent Application Ser. No. CN2024105048960 filed on 25 Apr. 2024.

TECHNICAL FIELD

The present invention relates to USB communication technologies, in particular to a data transmission method for a USB HUB internal routing module, and a USB HUB chip.

BACKGROUND

USB HUB is a commonly used computer peripheral device, the main functions and technical characteristics of which are defined by a special chapter in USB specification. As a USB device, a HUB upstream port UFP is usually connected to a USB host port of a computer, and a plurality of USB downstream ports DFP are extended from the hub, which are respectively connected to several USB devices as USB host ports.

Taking a high-speed USB HUB as an example (similar to an overspeed USB HUB, comprising a high-speed HUB module), the USB specification has requirements on internal delay of the HUB and total delay of multi-HUB cascade. In order to avoid extra waiting caused by converting a common USB physical transceiver (PHY) into 8-bit or 16-bit parallel data, a serial data mode under a 480 MHz clock is adopted between a HUB-dedicated USB transceiver and a high-speed routing module (hub repeater central unit) for data transmission.

The existing USB HUB internal data transmission is shown in FIG. 1. The USB host transmits a 480 Mbps high-speed data stream to the HUB upstream port, and a Receiver of an upstream port USB transceiver temporarily stores the data stream in an Elasticity Buffer. After at least 12 bits according to the specification, the serial data is taken out based on a 480 MHz global synchronization clock GCLK, and provided to the high-speed routing module and broadcast to all enabled downstream ports, and then transmitted to all USB devices through a Transmitter of a downstream port USB transceiver. If an address of a certain USB device is matched, the USB device may respond, and transmit the high-speed data stream to the connected HUB downstream port. A USB transceiver of the downstream port will recover the serial data and a variable reference clock, which will be temporarily stored in the Elasticity Buffer thereof for about 12 bits, and then synchronously taken out to the high-speed routing module. The routing module contains a multiplexer to transmit the selected serial data to the USB transceiver of the HUB upstream port and finally to the USB host. The above process completes one downstream data stream and one upstream data stream.

A common HUB has five HUB transceivers which comprise one upstream port and four downstream ports. Usually, the transceivers are arranged around a chip to connect with the outside. Although the global clock GCLK has the same frequency as a local clock of each transceiver, distances between the high-speed routing module and the five transceivers are not equal, and signal connection lines are long and lengths are different, there will be different phase differences between the global clock and the local clock of each transceiver. The global synchronization clock is 480 MHz and the serial data is not higher than 240 MHz, both of which are high-frequency and high-speed signals. If the wiring is too long, the jitter is large, and the serial data and the global clock are easily mismatched. Especially for a 7-port HUB internally provided with 8 transceivers, when the high-speed routing module processes upstream data stream, at least 7-to-1 multiplexer will be used to select from the serial data transmit by 7 transceivers with different distances. Therefore, it is difficult to directly apply the selected serial data based on the global clock, and too complicated processing solution will increase the internal delay of the HUB, which is not conducive to the compatibility when multiple hubs are cascaded.

SUMMARY

Object of the present invention: in order to solve a problem that clocks are not easy to synchronize in a USB HUB internal data transmission process in the prior art, the present invention provides an USB HUB internal data transmission method and a USB HUB chip.

Technical solutions: a USB HUB internal data transmission method comprises the following steps of:
  receiving, by a first USB transceiver, target serial data and saving the target serial data in an elasticity buffer;
  transmitting, by the first USB transceiver, the target serial data and a serial data valid signal to a high-speed routing module, and inserting inserted data into the target serial data and transmitting the data to the high-speed routing module before the serial data valid signal is asserted, wherein the inserted data contains N data bits;
  receiving, by the high-speed routing module, the serial data signal after insertion and transmitting the serial data signal after insertion out, wherein the serial data signal after insertion comprises the inserted data and the target serial data; and
  re-synchronizing the serial data signal after insertion before transmitting to obtain the synchronized serial data and a local clock, which are transmitted by a second USB transceiver;
  wherein, time duration of the N data bits is no less than a synchronization time required for re-synchronizing before transmitting.

Further, the method of inserting the inserted data into the target serial data and transmitting the data to the high-speed routing module comprises: adopting a multiplexer, and selecting to transmit the inserted data to the high-speed routing module before the serial data valid signal is asserted; and when the serial data valid signal is asserted, selecting to transmit the target serial data in the elasticity buffer to the high-speed routing module.

Further, the inserted data is one or more of the input serial data of the elasticity buffer, the data after the input serial data of the elasticity buffer is synchronized by the global clock, and serial data generated based on a global synchronization clock.

Further, the first USB transceiver not only transmits the target serial data and the serial data valid signal to the high-speed routing module, but also transmits a receiving states signal to the high-speed routing module or a HUB state machine, and the receiving state signal is asserted earlier than the serial data valid signal, so that the inserted data passes through the high-speed routing module.

Further, the re-synchronizing before transmitting means synchronizing the local clock with the serial data signal after insertion, specifically adopting any of the following methods:
- sampling the inserted data part of the serial data signal after insertion with a local multi-phase clock, finding a local clock with a phase that best matches the serial data signal after insertion according to a sampling result as a synchronous local clock, and keeping the phase locked during a valid period of the serial data valid signal; and
- sampling the inserted data part of the serial data signal after insertion with a higher-frequency clock with a frequency at least three times that of the local clock, adjusting frequency division to generate a local clock which is relatively matched with the serial data signal after insertion as a synchronous local clock according to a sampling result, and keeping the phase locked during the valid period of the serial data valid signal.

Further, the re-synchronizing before transmitting means synchronizing the serial data signal after insertion with the local clock, which specifically comprises: sampling the inserted data part of the serial data signal after insertion with a local multi-phase clock to form a plurality of sampling results with delay relationship, finding delayed serial data that best matches the transmitted local clock as synchronous serial data, and keeping the phase locked during a valid period of the serial data valid signal.

A USB HUB chip comprises:
- at least a first USB transceiver and a second USB transceiver, wherein the first USB transceiver is used for receiving target serial data and storing the target serial data in an elasticity buffer, and transmitting the target serial data and a serial data valid signal to a high-speed routing module;
- a data bit insertion unit, connected with the first USB transceiver and the high-speed routing module, and used for inserting inserted data into the target serial data and transmitting the data to the high-speed routing module before the serial data valid signal transmitted by the first USB transceiver to the high-speed routing module is asserted, wherein the inserted data contains N data bits, and time duration of the N data bits is no less than a synchronization time required for re-synchronizing before transmitting;
- the high-speed routing module, connected with the first USB transceiver and the data bit insertion unit, and used for receiving the serial data signal after insertion and transmitting the serial data signal after insertion out, wherein the serial data signal after insertion comprises the inserted data and the target serial data; and
- a re-synchronization unit before transmitting, connected with the high-speed routing module and the second USB transceiver, and used for re-synchronizing the serial data signal after insertion before transmitting to obtain the synchronized serial data and a local clock, and transmitting the synchronized serial data and the local clock to the second USB transceiver.

Further, the data bit insertion unit comprises a 2-to-1 multiplexer, a first input and a second input of the multiplexer are respectively connected to the inserted data and an output of the elasticity buffer, an output of the multiplexer is connected to the high-speed routing module, the select signal of the multiplexer is connected to a serial data valid signal output of the first USB transceiver, and before the serial data valid signal is asserted, the inserted data is selected to be transmitted to the high-speed routing module; and when the serial data valid signal is asserted, the target serial data in the elasticity buffer is selected to be transmitted to the high-speed routing module.

Further, the data bit insertion unit comprises a 2-to-1 multiplexer, a first input and a second input of the multiplexer are respectively connected to the inserted data and an output of the elasticity buffer, an output of the multiplexer is connected to the high-speed routing module, and the select signal of the multiplexer is connected to a combinational signal, the combinational signal is the result of a logical calculation, the input signals include the serial data valid signal of the first USB transceiver and the receiving state signal, and when the receiving state signal is asserted and the serial data valid signal is deasserted, the inserted data is selected to be output to the high-speed routing module; and when the receiving state signal is asserted and the serial data valid signal is asserted, the target serial data is selected to be output to the high-speed routing module.

Further, the inserted data is one or more of the input serial data of the elasticity buffer, the data after the input serial data of the elasticity buffer is synchronized by the global clock, and serial data generated based on a global synchronization clock.

Compared with the prior art, the USB HUB internal data transmission method and the USB HUB chip provided by the present invention have the beneficial effects:

Taking a high-speed HUB for example, a 480 MHz clock does not need to be synchronously transmitted with the serial data, high-frequency radiation is reduced, time sequence mismatching between the serial data and the global clock does not need to be considered, the difficulty of wiring and layout design is reduced, valid serial data bits do not need to be wasted for clock synchronization, internal delay of the HUB is reduced, long-distance wiring or expansion of more USB ports is facilitated, and compatibility in cascade application of a plurality of USB HUBs is improved.

DETAILED DESCRIPTION

The present invention will be further explained and described below with reference to the accompany drawings and specific embodiments.

Figure 1:
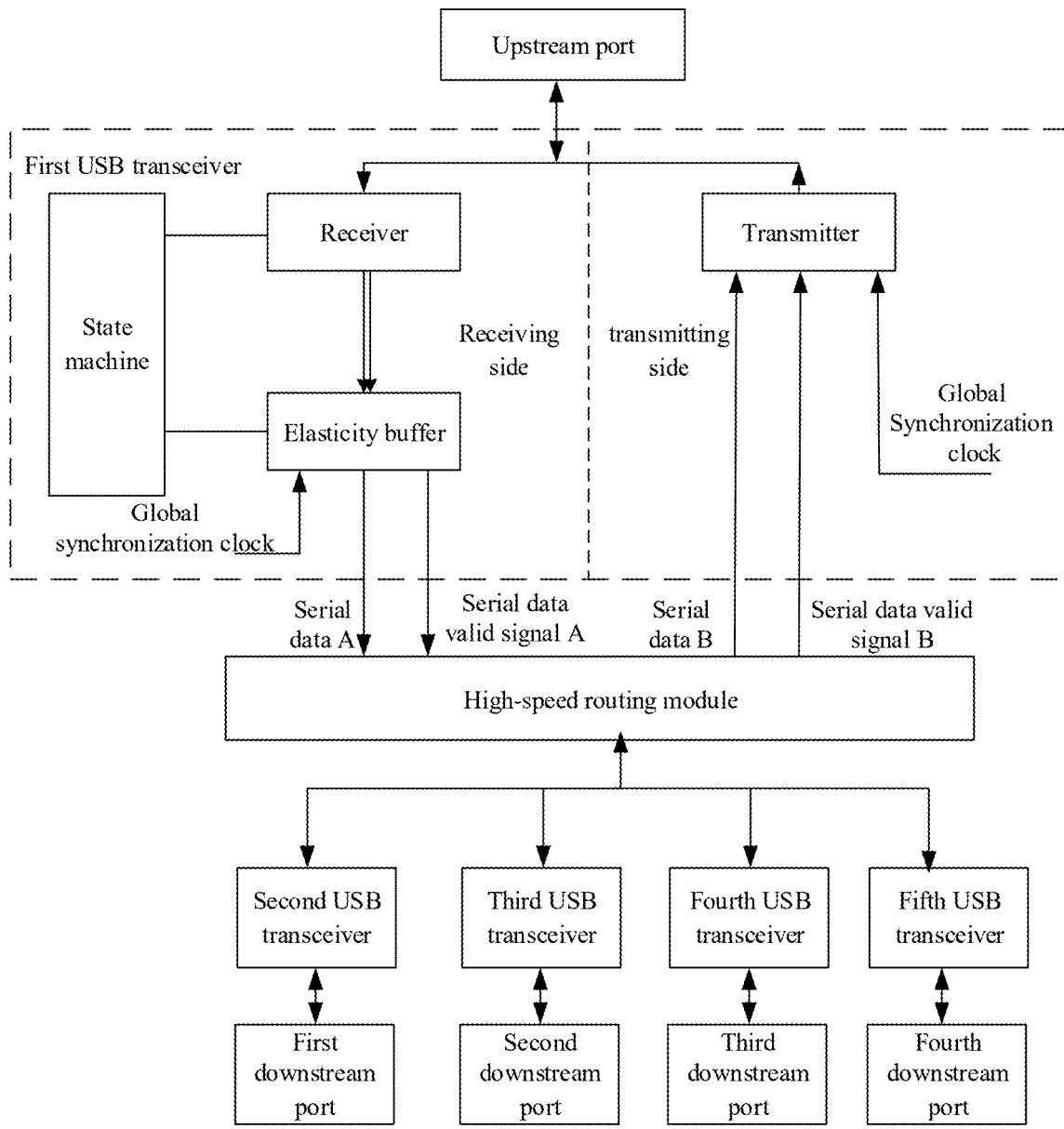
FIG. 1 is a flow chart of existing USB HUB internal data transmission.
Figure 2:
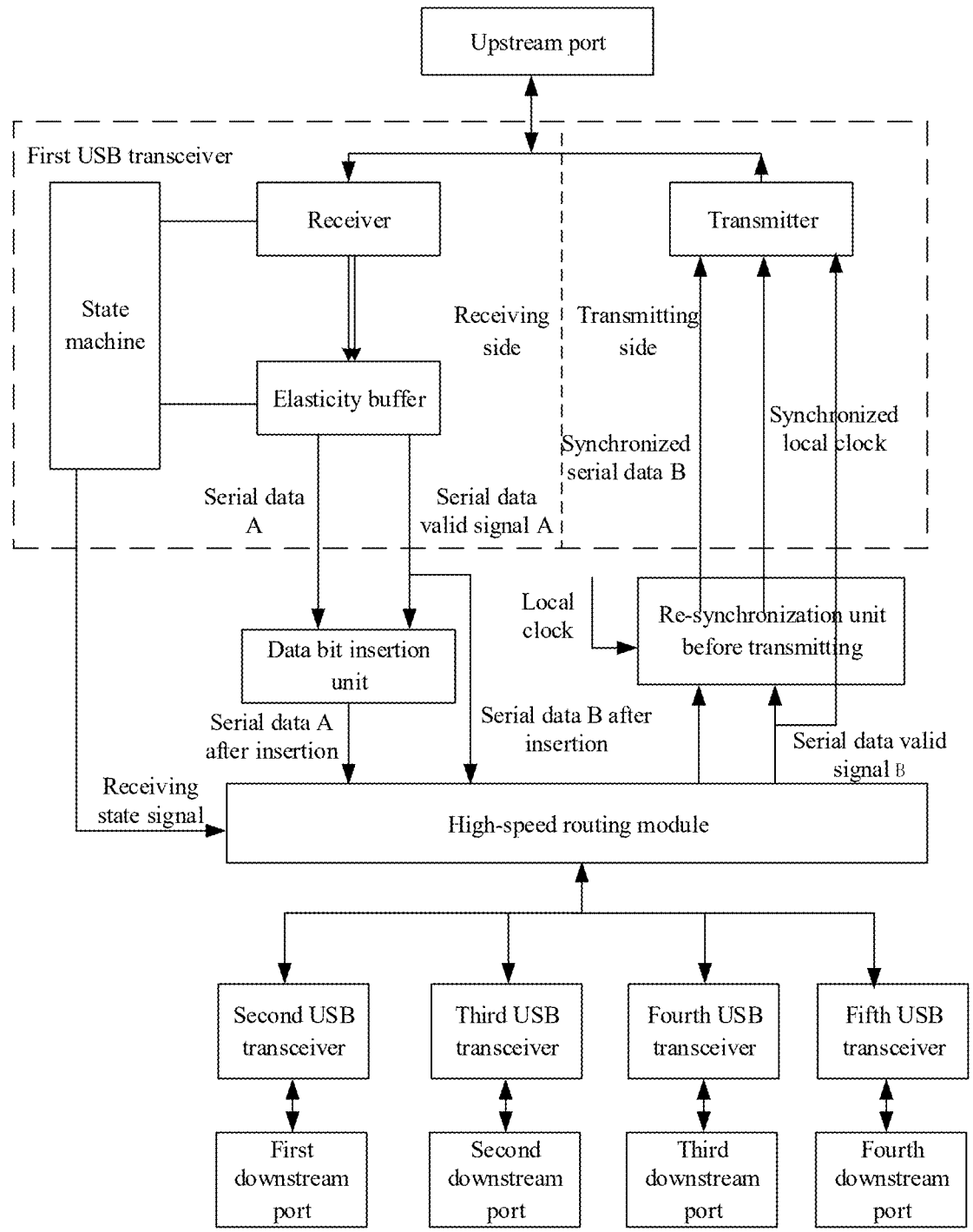
FIG. 2 is a flow chart of USB HUB internal data transmission of the present invention.

FIG. 2 shows a flow chart of USB HUB internal data transmission of this embodiment. In this embodiment, a USB HUB with five USB transceivers which comprise one upstream port and four downstream ports is taken as an example. Because each USB transceiver has the same structure, comprising a receiving side and a transmitting side, only an internal structure of the first USB transceiver is shown in the figure as a schematic, and internal structures of other USB transceivers are the same as that of the first USB transceiver. In order to simplify the description, non-high-speed parts and non-critical parts, such as TT and full-speed route switching, which are not related to the present invention or are conventional, are omitted in the figure. In addition, a state machine has complicated connection relationships with most unit modules in the HUB, such as each port, each receiving side, each transmitting side, the high-speed routing module, and the like. In order to simplify the expression, conventional connections and expressions have been omitted. Serial data A represents a downstream data stream and serial data B represents an upstream data stream.

Taking the downstream data stream for example, a USB HUB internal data transmission method comprises the following steps of:
receiving, by a first USB transceiver, target serial data and saving the target serial data in an elasticity buffer;
transmitting, by the first USB transceiver, the target serial data and a serial data valid signal to a high-speed routing module, and inserting inserted data into the target serial data and transmitting the data to the high-speed routing module before the serial data valid signal is asserted, wherein the inserted data contains N data bits;
receiving, by the high-speed routing module, the serial data signal after insertion and transmitting the serial data signal after insertion out, wherein the serial data signal after insertion comprises the inserted data and the target serial data; and
re-synchronizing the serial data signal after insertion before transmitting. The data of N data bits is inserted before the serial data valid signal is asserted, which is used to synchronize the data and the clock in advance before transmitting, which avoids taking up the time after the serial data is asserted. The process of re-synchronizing before transmitting synchronizes the local clock with the serial data signal after insertion transmitted by the high-speed routing module, and keeps synchronization locking during an asserted period of the serial data valid signal. During a period when the serial data is deasserted, the synchronization locking can be released. The synchronized serial data and the local clock are transmitted by a second USB transceiver.

Time duration of the N data bits is no less than a synchronization time required for re-synchronizing before transmitting. For example, in this embodiment, the re-synchronization can be completed within time duration of one data bit, N may be 2, and the inserted data is "01", or the inserted data may also be set as a longer string of data. It can be seen from a function of the inserted data that the inserted data may be transmitted immediately before the target serial data is transmitted, or may be transmitted at intervals of several bits, that is, after the inserted data is transmitted to the high-speed routing module, the target serial data is transmitted after the time of several data bits pass; as long as it is ensured that the inserted data can be used for re-synchronization when reaching the second USB transceiver before the target serial data is transmitted, and the synchronization of the clock and the data is completed before the target serial data is transmitted.

There are many methods to insert the inserted data into the target serial data and transmit the data to the high-speed routing module before the serial data valid signal is asserted. In this embodiment, a multiplexer is adopted for realization. Before the serial data valid signal is asserted, the inserted data is selected to be transmitted to the high-speed routing module. The inserted data earlier than the target serial data output by the elasticity buffer may be used for synchronization in advance before transmitting. When the serial data valid signal is asserted, the target serial data in the elasticity buffer is selected to be transmitted to the high-speed routing module, which is conventional serial data.

The inserted data is one or more of the input serial data of the elasticity buffer, the data after the input serial data of the elasticity buffer is synchronized by the global clock, and serial data generated based on a global synchronization clock. The serial data generated based on the global synchronization clock is, for example, continuously synchronized serial data with intervals of 0 and 1 formed by using a flip-flop to flip constantly based on the global synchronization clock. Contents of the inserted data may be varied. What is important is a length of the inserted data, that is, a time of N multiplying a width of a single data bit, is no less than the synchronization time required by the re-synchronization unit before transmitting, so that the synchronization of the data and the clock can be completed before the target serial data.

The first USB transceiver cannot only transmit the target serial data and the serial data valid signal to the high-speed routing module, but also transmit a receiving state signal RXV (equivalent to Squelch signal) to the high-speed routing module or a HUB state machine, and the RXV is asserted earlier than the serial data valid signal. Taking a HUB upstream data stream as an example, a receiving state signal of each downstream port USB transceiver is connected to the high-speed routing module or the HUB state machine. When the receiving state signal of a certain downstream port USB transceiver is asserted, the high-speed routing module and the HUB state machine make a judgment in combination with other states such as a connection of the HUB port, and select a downstream port which is matched and has valid receiving state signal as a current data source, and a serial data signal and a valid serial data signal of the current data source are transmit to the re-synchronization unit before transmitting at the transmitting side of the upstream port USB transceiver through a multiplexer of the high-speed routing module. The receiving state signal is earlier than the serial data valid signal, which is convenient for the inserted data to pass multiplexer and routing.

There are two methods for re-synchronizing before transmitting. The first method is to select or adjust a local clock to synchronize the local clock used for transmitting with the serial data signal. The second method is to select or adjust the delay of the serial data signal to synchronize the serial data used for transmitting with the local clock used for transmitting. The two methods can both realize re-synchronizing before transmitting.

The first method may also adopt any one of the following modes:
sampling the inserted data part of the serial data signal after insertion with a local multi-phase clock, finding a local clock with a phase that best matches the serial data signal after insertion according to a sampling result as a synchronous local clock, and keeping the phase locked during a valid period of the serial data valid signal; and
sampling the inserted data part of the serial data signal after insertion with a higher-frequency clock with a frequency at least three times that of the local clock, adjusting frequency division to generate a local clock which is relatively matched with the serial data signal after insertion as a synchronous local clock according to a sampling result, and keeping the phase locked during the valid period of the serial data valid signal.

The second method specifically comprises: sampling the inserted data part of the serial data signal after insertion with a local multi-phase clock to form a plurality of sampling results with delay relationship, finding delayed serial data that best matches the transmitted local clock as synchronous serial data, and keeping the phase locked during a valid period of the serial data valid signal.

A USB HUB chip, as shown in FIG. 2, comprises:

at least a first USB transceiver and a second USB transceiver, wherein the first USB transceiver is used for receiving target serial data and saving the target serial data in an elasticity buffer, and transmitting the target serial data and a serial data valid signal to a high-speed routing module;

a data bit insertion unit, connected with the first USB transceiver and the high-speed routing module, and used for inserting inserted data into the target serial data and transmitting the data to the high-speed routing module before the serial data valid signal transmitted by the first USB transceiver to the high-speed routing module is asserted, wherein the inserted data contains N data bits, and time duration of the N data bits is no less than a synchronization time required for re-synchronizing before transmitting;

the high-speed routing module, connected with the first USB transceiver and the data bit insertion unit, and used for receiving the serial data signal after insertion and transmitting the serial data signal after insertion out, wherein the serial data signal after insertion comprises the inserted data and the target serial data; and a re-synchronization unit before transmitting, connected with the high-speed routing module and the second USB transceiver, and used for re-synchronizing the serial data signal after insertion before transmitting to obtain the synchronized serial data and a local clock, and transmitting the synchronized serial data and the local clock to the second USB transceiver.

FIG. 2 is a simplified drawing. In fact, a data bit insertion unit and a re-synchronization unit before transmitting are actually connected between each USB transceiver and the high-speed routing module. The data bit insertion unit is located in a receiving side path between the USB transceiver and the high-speed routing module, and the re-synchronization unit before transmitting is located in a transmitting side path between the high-speed routing module and the USB transceiver.

The data bit insertion unit is realized by adopting the multiplexer, wherein the multiplexer is a 2-to-1 multiplexer, a first input and a second input of the multiplexer are respectively connected to the inserted data and an output of the elasticity buffer, an output of the multiplexer is connected to the high-speed routing module, the select signal of the multiplexer is connected to a control signal, the control signal may directly be the serial data valid signal of the first USB transceiver. Before the serial data valid signal is asserted, the inserted data is selected to be transmitted to the high-speed routing module. When the serial data valid signal is asserted, the target serial data in the elasticity buffer is selected to be transmitted to the high-speed routing module. The control signal may also be a combinational signal, the combinational control signal is the result of a logical calculation, the input signals include the serial data valid signal and the receiving state signal, and when the receiving state signal is asserted and the serial data valid signal is deasserted, the inserted data is selected to be output to the high-speed routing module. When the receiving state signal is asserted and the serial data valid signal is asserted, the target serial data in the elasticity buffer is selected to be transmit to the high-speed routing module.

In this embodiment, the data of N data bits is inserted before the serial data valid signal is asserted, which is used to synchronize the data and the clock in advance before transmitting, so that the clock and the data do not need to be transmitted together in the USB HUB internal transmission process. If there is no data bit insertion unit, the clock data re-synchronization process of the re-synchronization unit before transmitting will inevitably take up several data bits. As a result, after one USB data packet passes through a first-level HUB, a synchronization pattern (Sync Patten) of the USB data packet will lose several synchronization bits, and the losses will be accumulated when multiple hubs are cascaded, so that the time for clock synchronization at the front stage and the last stage is shorter when receiving data. However, the method of this embodiment will not cause the loss of the synchronization bits of the Sync Pattern, which reduces the internal delay of the HUB and is beneficial to improving the compatibility in the application of the HUB.

What is claimed is:

1. A USB HUB internal data transmission method, comprising the following steps of:

receiving, by a first USB transceiver, target serial data and saving the target serial data in an elasticity buffer;

transmitting, by the first USB transceiver, the target serial data and a serial data valid signal to a high-speed routing module, and inserting inserted data into the target serial data and transmitting the data to the high-speed routing module before the serial data valid signal is asserted, wherein the inserted data contains N data bits;

receiving, by the high-speed routing module, the serial data signal after insertion and transmitting the serial data signal after insertion out, wherein the serial data signal after insertion comprises the inserted data and the target serial data; and re-synchronizing the serial data signal after insertion before transmitting to obtain the synchronized serial data and a local clock, which are transmitted by a second USB transceiver;

wherein, time duration of the N data bits is no less than a synchronization time required for re-synchronizing before transmitting.

2. The USB HUB internal data transmission method according to claim 1, wherein the method of inserting the inserted data into the target serial data and transmitting the data to the high-speed routing module comprises: adopting a multiplexer, and selecting to transmit the inserted data to the high-speed routing module before the serial data valid signal is asserted; and when the serial data valid signal is asserted, selecting to transmit the target serial data in the elasticity buffer to the high-speed routing module.

3. The USB HUB internal data transmission method according to claim 1, wherein the inserted data is one or more of the input serial data of the elasticity buffer, the data after the input serial data of the elasticity buffer is synchronized by the global clock, and serial data generated based on a global synchronization clock.

4. The USB HUB internal data transmission method according to claim 2, wherein the inserted data is one or more of the input serial data of the elasticity buffer, the data after the input serial data of the elasticity buffer is synchronized by the global clock, and serial data generated based on a global synchronization clock.

5. The USB HUB internal data transmission method according to claim 1, wherein the first USB transceiver not only transmits the target serial data and the serial data valid signal to the high-speed routing module, but also transmits a receiving states signal to the high-speed routing module or a HUB state machine, and the receiving state signal is asserted earlier than the serial data valid signal, so that the inserted data passes through the high-speed routing module.

6. The USB HUB internal data transmission method according to claim 2, wherein the first USB transceiver not only transmits the target serial data and the serial data valid signal to the high-speed routing module, but also transmits a receiving states signal to the high-speed routing module or a HUB state machine, and the receiving state signal is asserted earlier than the serial data valid signal, so that the inserted data passes through the high-speed routing module.

7. The USB HUB internal data transmission method according to claim 1, wherein the re-synchronizing before transmitting means synchronizing the local clock with the serial data signal after insertion, specifically adopting any of the following methods:
sampling the inserted data part of the serial data signal after insertion with a local multi-phase clock, finding a local clock with a phase that best matches the serial data signal after insertion according to a sampling result as a synchronous local clock, and keeping the phase locked during a valid period of the serial data valid signal; and
sampling the inserted data part of the serial data signal after insertion with a higher-frequency clock with a frequency at least three times that of the local clock, adjusting frequency division to generate a local clock which is relatively matched with the serial data signal after insertion as a synchronous local clock according to a sampling result, and keeping the phase locked during the valid period of the serial data valid signal.

8. The USB HUB internal data transmission method according to claim 2, wherein the re-synchronizing before transmitting means synchronizing the local clock with the serial data signal after insertion, specifically adopting any of the following methods:
sampling the inserted data part of the serial data signal after insertion with a local multi-phase clock, finding a local clock with a phase that best matches the serial data signal after insertion according to a sampling result as a synchronous local clock, and keeping the phase locked during a valid period of the serial data valid signal; and
sampling the inserted data part of the serial data signal after insertion with a higher-frequency clock with a frequency at least three times that of the local clock, adjusting frequency division to generate a local clock which is relatively matched with the serial data signal after insertion as a synchronous local clock according to a sampling result, and keeping the phase locked during the valid period of the serial data valid signal.

9. The USB HUB internal data transmission method according to claim 1, wherein the re-synchronizing before transmitting means synchronizing the serial data signal after insertion with the local clock, which specifically comprises: sampling the inserted data part of the serial data signal after insertion with a local multi-phase clock to form a plurality of sampling results with delay relationship, finding delayed serial data that best matches the transmitted local clock as synchronous serial data, and keeping the phase locked during a asserted period of the serial data valid signal.

10. The USB HUB internal data transmission method according to claim 2, wherein the re-synchronizing before transmitting means synchronizing the serial data signal after insertion with the local clock, which specifically comprises: sampling the inserted data part of the serial data signal after insertion with a local multi-phase clock to form a plurality of sampling results with delay relationship, finding delayed serial data that best matches the transmitted local clock as synchronous serial data, and keeping the phase locked during a asserted period of the serial data valid signal.

11. A USB HUB chip, comprising:
at least a first USB transceiver and a second USB transceiver, wherein the first USB transceiver is used for receiving target serial data and storing the target serial data in an elasticity buffer, and transmitting the target serial data and a serial data valid signal to a high-speed routing module;
a data bit insertion unit, connected with the first USB transceiver and the high-speed routing module, and used for inserting inserted data into the target serial data and transmitting the data to the high-speed routing module before the serial data valid signal transmitted by the first USB transceiver to the high-speed routing module is asserted, wherein the inserted data contains N data bits, and time duration of the N data bits is no less than a synchronization time required for re-synchronizing before transmitting;
the high-speed routing module, connected with the first USB transceiver and the data bit insertion unit, and used for receiving the serial data signal after insertion and transmitting the serial data signal after insertion out, wherein the serial data signal after insertion comprises the inserted data and the target serial data; and
a re-synchronization unit before transmitting, connected with the high-speed routing module and the second USB transceiver, and used for re-synchronizing the serial data signal after insertion before transmitting to obtain the synchronized serial data and a local clock, and transmitting the synchronized serial data and the local clock to the second USB transceiver.

12. The USB HUB chip according to claim 11, wherein the data bit insertion unit comprises a 2-to-1 multiplexer, a first input and a second input of the multiplexer are respectively connected to the inserted data and an output of the elasticity buffer, an output of the multiplexer is connected to the high-speed routing module, the select signal of the multiplexer is connected to a serial data valid signal output of the first USB transceiver, and before the serial data valid signal is asserted, the inserted data is selected to be transmitted to the high-speed routing module;
and when the serial data valid signal is asserted, the target serial data in the elasticity buffer is selected to be transmitted to the high-speed routing module.

13. The USB HUB chip according to claim 11, wherein the data bit insertion unit comprises a 2-to-1 multiplexer, a first input and a second input of the multiplexer are respectively connected to the inserted data and an output of the elasticity buffer, an output of the multiplexer is connected to the high-speed routing module, and the select signal of the multiplexer is connected to a combinational signal, the combinational signal is the result of a logical calculation, the input signals include the serial data valid signal of the first USB transceiver and the receiving state signal, and when the receiving state signal is asserted and the serial data valid signal is deasserted, the inserted data is selected to be output to the high-speed routing module; and when the receiving state signal is asserted and the serial data valid signal is asserted, the target serial data is selected to be output to the high-speed routing module.

14. The USB HUB chip according to claim 11, wherein the inserted data is one or more of the input serial data of the elasticity buffer, the data after the input serial data of the elasticity buffer is synchronized by the global clock, and serial data generated based on a global synchronization clock.

15. The USB HUB chip according to claim 11, wherein the inserted data is one or more of the input serial data of the elasticity buffer, the data after the input serial data of the elasticity buffer is synchronized by the global clock, and serial data generated based on a global synchronization clock.

16. The USB HUB chip according to claim 12, wherein the inserted data is one or more of the input serial data of the elasticity buffer, the data after the input serial data of the elasticity buffer is synchronized by the global clock, and serial data generated based on a global synchronization clock.

17. The USB HUB chip according to claim 13, wherein the inserted data is one or more of the input serial data of the elasticity buffer, the data after the input serial data of the elasticity buffer is synchronized by the global clock, and serial data generated based on a global synchronization clock.

* * * * *